(12) United States Patent
Wagner et al.

(10) Patent No.: US 8,649,457 B2
(45) Date of Patent: Feb. 11, 2014

(54) PRECODING PROCESS FOR A TRANSMITTER OF A MU-MIMO COMMUNICATION SYSTEM

(75) Inventors: Sebastian Wagner, Antibes (FR); Romain Couillet, Antibes (FR)

(73) Assignee: ST-Ericsson SA, Plan-les-Ouates (CH)

( * ) Notice: Subject to any disclaimer, the term of this patent is extended or adjusted under 35 U.S.C. 154(b) by 131 days.

(21) Appl. No.: 13/383,967

(22) PCT Filed: Jul. 20, 2010

(86) PCT No.: PCT/EP2010/004427
§ 371 (c)(1),
(2), (4) Date: Mar. 29, 2012

(87) PCT Pub. No.: WO2011/009592
PCT Pub. Date: Jan. 27, 2011

(65) Prior Publication Data
US 2012/0177142 A1 Jul. 12, 2012

(30) Foreign Application Priority Data
Jul. 21, 2009 (EP) .................................. 09368025

(51) Int. Cl.
*H04B 7/02* (2006.01)
(52) U.S. Cl.
USPC .......................................................... 375/267
(58) Field of Classification Search
USPC ............................... 375/260, 267, 299; 455/59
See application file for complete search history.

(56) References Cited

U.S. PATENT DOCUMENTS

| | | | | |
|---|---|---|---|---|
| 7,809,074 B2 * | 10/2010 | Kotecha et al. | ............... | 375/267 |
| 8,107,550 B2 * | 1/2012 | Ashikhmin | .................. | 375/267 |
| 8,369,438 B2 * | 2/2013 | Lee et al. | ...................... | 375/267 |
| 2009/0175375 A1 * | 7/2009 | Zhang | ........................... | 375/267 |

OTHER PUBLICATIONS

International Search Report issued in corresponding International application No. PCT/EP2010/004427, mailed Oct. 4, 2010.
Written Opinion of the International Searching Authority issued in corresponding International application No. PCT/EP2010/004427, mailed Oct. 4, 2010.
Mailaender, Laurence: "Indoor Network MIMO Performance with Regularized Zero-Forcing Transmission," Proceedings of the IEEE 10th International Symposium on Spread Spectrum Techniques and Applications, Aug. 25, 2008, pp. 129-132, XP031318995, ISBN: 978-1-4244-2203-6.
Eugene P. Wigner: "Random Matrices in Physics," SIAM Review, vol. 9, No. 1, pp. 1-23, Jan. 1967.
Jack W. Silverstein et al.: "On the Empirical Distribution of Eigenvalues of a Class of Large Dimensional Random Matrices," Journal of Multivariate Analysis, vol. 54, Issue 2, pp. 175-192, 1995.
Antonia M. Tulino et al.: "Impact of Antenna Correlation on the Capacity of Multi-Antenna Channels," IEEE Transactions on Information Theory, vol. 51, No. 7, pp. 2491-2509, Jul. 2005.
Chen-Nee Chua et al.: "Capacity Scaling in MIMO Wireless Systems Under Correlated Fading," IEEE Transactions on Information Theory, vol. 48, No. 3, pp. 637-650, Mar. 2002.

* cited by examiner

*Primary Examiner* — David B. Lugo
(74) *Attorney, Agent, or Firm* — Patent Portfolio Builders PLLC

(57) ABSTRACT

A Precoding process for a transmitter of a MU-MIMO communication system comprising M antennas in the transmitter and K User Equipments (UE), said precoding being based on a Regularized Zero Forcing (R-ZF) linear precoding.

10 Claims, 6 Drawing Sheets

INPUT: Λ, P
OUTPUT: $\alpha$
Initialize parameters
$\alpha_{max} = 1$; $\alpha_{min} = 0$; $F = 0$; $\varepsilon = 10^{-3}$; N
Main loop
while $|F - P| > \varepsilon$ do
   $\alpha = \frac{1}{2}(\alpha_{max} + \alpha_{min})$
   # Solve fixed-point equation (19) for $z = -\alpha$
   $S = 0$
   for $n = 1$ to $N$ do
      $S = \left(\alpha + \frac{1}{M}\sum_{i=1}^{M} \frac{\lambda_i}{1+\frac{\lambda_i}{\beta}S}\right)^{-1}$
   end for
   # Solve fixed-point equation (21) for $z = -\alpha$
   $S_d = 0$
   for $n = 1$ to $N$ do
      $S_d = \left(1 + \frac{1}{M}\sum_{i=1}^{M} \frac{\frac{\lambda_i^2}{\beta}S_d}{(1+\frac{\lambda_i}{\beta}S)^2}\right) \cdot S^2$
   end for
   # Compute equation (18)
   $F = \frac{S}{\beta} + \frac{\beta-1}{\beta\alpha} - \alpha\left(\frac{S_d}{\beta} + \frac{\beta-1}{\beta\alpha^2}\right)$
   # Adapt the interval $(\alpha_{min}, \alpha_{max})$
   if $F - P < 0$ then
      $\alpha_{max} = \alpha$
   else
      $\alpha_{min} = \alpha$
   end if
end while

Fig. 3

4 × 4 MIMO, medium correlation (LTE), SNR = 10 dB $32 \times 32$ MIMO, UCA, SNR = 10 dB, $r = 2\frac{\lambda}{\pi e}$

PRECODING PROCESS FOR A TRANSMITTER OF A MU-MIMO COMMUNICATION SYSTEM

TECHNICAL FIELD

The invention relates to the field of wireless telecommunications and more particularly to a Precoding process for a transmitter of a MU-MIMO communication system.

BACKGROUND ART

MIMO (Multiple-Input and Multiple-Output) is a rising radio technology that uses multiple antennas at both the transmitter and the User Equipment (UE) of a communication system for transmitting data. Advantageously, MIMO achieves the increase of data throughput and link range without the need of additional bandwidth or transmit power.

An advanced MIMO technology called MU-MIMO (Multi-User MIMO), is widely used today to exploit the availability of multiple independent UEs. MU-MIMO further enhances the communication capabilities of each UE.

The performance of MIMO and correspondingly MU-MIMO radio systems relies on a precoding operation which is performed at the transmitter of a communication system. Specifically, precoding is a beamforming technique that supports multi-layer transmission of MIMO systems. In precoding, the multiple streams of the signals are emitted from the transmit antennas of the transmitter with independent and appropriate weighting per each antenna such that the link throughput is maximized at the receiver (UE) output and the interference between the streams is minimized.

Precoding algorithms used in MU-MIMO are divided into non linear and linear precoding types.

A non linear precoding technique is the so-called Dirty-Paper Coding (DPC) which pre-cancels the interference of the signal transmitted by the transmitter without any power penalties. The transmitter is assumed to know the interference signal regardless of channels state information knowledge. However, the use of this technique is inconvenient according to its cost and complexity and, for such reason, a linear precoding is often preferred.

Indeed, linear precoding can achieve reasonable throughput performance with lower complexity and cost relative to nonlinear precoding. Linear precoding includes zero-forcing (ZF) and Regularized Zero-Forcing (R-ZF) precoding while non linear precoding includes Dirty-Paper Coding (DPC).

Zero-forcing (ZF) technique addresses the drawback of high complexity and cost and performs close to the system capacity. However, it is required that the transmitter knows the downlink channel state information. Accordingly, in the case of limited or inaccurate channel state information, significant loss of the system throughput may occur.

Advantageously to Zero Forcing (ZF), Regularized Zero-Forcing (R-ZF) precoding manages to compensate unfavorable channel conditions by computing a regularization parameter $\alpha$. This computation is performed at the transmitter for each channel estimation (performed by the receiver) and has to satisfy the transmit sum power constraint. Unfortunately, the computation of $\alpha$ requires knowledge of the downlink channel at the transmitter and thus, in the case of ill-conditioned channel estimates the system throughput is degraded.

In such a context, there is a strong desire to propose a simple solution that provides a satisfactory computation of the regularization parameter $\alpha$ and is independent of the channel estimation.

SUMMARY OF THE INVENTION

It is an object of the present invention to provide a simple process for computing the regularization parameter $\alpha$, said process being independent of the channel estimation.

It is another object of the present invention to provide a process for computing the regularization parameter $\alpha$, said process depending on the spatial correlation of the transmit antennas at the transmitter and satisfying the transmit sum power constraint.

These and other objects of the invention are achieved by means of a precoding process for a transmitter of a MU-MIMO communication system comprising M antennas in the transmitter and K User Equipments (UE), said precoding being based on a Regularized Zero Forcing (R-ZF) linear precoding of the type:

$$G = H^H(HH^H + M\alpha I_K)^{-1}$$
$$= (H^H H + M\alpha I_M)^{-1} H^H$$

With:

H being a complex matrix representative of the K×M channel estimates, said H matrix comprising channel coefficients which are correlated with corresponding correlation coefficients being the entries of a correlation matrix $\Theta_T$, $I_K$ and $I_M$ being the identity matrix, respectively of size K×K and M×M;

And $\alpha$ being the regularization parameter,

The precoding process comprises the steps of:

a) computing the correlation matrix $\Theta_T$;

b) initializing two parameters $\alpha_{max}$ and $\alpha_{min}$;

c) computing $\alpha = \frac{1}{2}(\alpha_{max} + \alpha_{min})$;

d) determining for $z = -\alpha$ the value of S ($S_{H'_\omega \Theta_T H'^H_\omega}(z)$) solving the fixed-point equation:

$$S(z) = \left( \int \frac{\lambda \mu_{\Theta_T}(\lambda) d\lambda}{1 + \frac{\lambda}{\beta} S(z)} - z \right)^{-1}$$

With $\lambda$ being the eigenvalues of the correlation matrix $\Theta_T$, $\mu$ being the empirical eigenvalue distribution functions of $\Theta_T$ and $\beta$ being M/K;

e) determining for $z = -\alpha$ the value of $S_d$ $$\left( \frac{d}{dx} S_{H'_\omega \Theta_T H'^{H(z)}_\omega} \right)$$

solving the fixed-point equation:

$$S_d(z) = \frac{1 + \int \frac{\frac{\lambda^2}{\beta} S_d(z)}{\left(1 + \frac{\lambda}{\beta} S(z)\right)^2} \mu_{\Theta_T}(\lambda) d\lambda}{(S(z))^{-2}}$$

f) computing the equation $$F = \frac{S}{\beta} + \frac{\beta-1}{\beta\alpha} - \alpha\left(\frac{S_d}{\beta} + \frac{\beta-1}{\beta\alpha^2}\right)$$

g) adapting the interval $[\alpha_{mm}, \alpha_{max}]$ as follows:

if F−P<0, with P being the total available transmit power, then computing $\alpha_{max}=\alpha$, otherwise computing $\alpha_{min}=\alpha$ In one particular embodiment, the computation of regularization parameter α is based on a WHILE loop being executed as long as the absolute value of F−P (ABS(F−P)) is superior to a predetermined value ε.

Preferably, the precoding is based on two successive FOR loops.

A first FOR loop executed for a number of N occurrences which includes the steps of:

initializing S to a predetermined value, for instance 0, performing, for n=1 to N, the following computation:

$$S = \left(\alpha + \frac{1}{M}\sum_{i=1}^{M} \frac{\lambda_i}{1+\frac{\lambda_i}{\beta}S}\right)^{-1}$$

A second FOR loop which comprises the steps of:

initializing $S_d$ to a predetermined value;

performing, for n=1 to N, the following computation:

$$S_d = \left(1 + \frac{1}{M}\sum_{i=1}^{M} \frac{\frac{\lambda_i^2}{\beta}S_d}{\left(1+\frac{\lambda_i}{\beta}S\right)^2}\right)\cdot S^2$$

Preferably, the transmitter comprises a number of antennas (M) which is equal to the number of UE(s) (K).

The invention also achieves a transmitter for a MU-MIMO communication system comprising M antennas in the transmitter and K User Equipments (UE), said precoding being based on a Regularized Zero Forcing (R-ZF) linear precoding of the type mentioned above, The transmitter particularly includes:

means for computing the correlation matrix $\Theta_T$;

means for initializing the two parameters $\alpha_{max}$ and $\alpha_{min}$ means for computing $\alpha=\frac{1}{2}(\alpha_{max}\alpha_{min})$;

means for determining for z=−α the value of S solving the fixed-point equation:

$$S(z) = \left(\int \frac{\lambda\mu_{\Theta_T}(\lambda)d\lambda}{1+\frac{\lambda}{\beta}S(z)} - z\right)^{-1}$$

means for determining for z=−α the value of $S_d$ $$\left(\frac{d}{dx}S_{H'_\omega\Theta_T H'^H_\omega(z)}\right)$$

solving the fixed-point equation:

$$S_d(z) = \frac{1 + \int \frac{\frac{\lambda^2}{\beta}S_d(z)}{\left(1+\frac{\lambda}{\beta}S(z)\right)^2}\mu_{\Theta_T}(\lambda)d\lambda}{(S(z))^{-2}}$$

means for computing the equation $$F = \frac{S}{\beta} + \frac{\beta-1}{\beta\alpha} - \alpha\left(\frac{S_d}{\beta} + \frac{\beta-1}{\beta\alpha^2}\right)$$

means for adapting the interval $[\alpha_{min}, \alpha_{max}]$ by using the following process:

if F−P<0, with P being the total available transmit power, then compute $\alpha_{max}=\alpha$, otherwise compute $\alpha_{min}=\alpha$;

In one embodiment, the transmitter includes means for performing one WHILE loop and two FOR loops for computing the regularization parameter α

DESCRIPTION OF THE DRAWINGS

Other features of one or more embodiments of the invention will be best understood by reference to the following detailed description when read in conjunction with the accompanying drawings.

FIG. 3 illustrates a second embodiment of a process based on the use of one WHILE loop and two FOR loops.

DESCRIPTION OF THE PREFERRED EMBODIMENT

Figure 1:
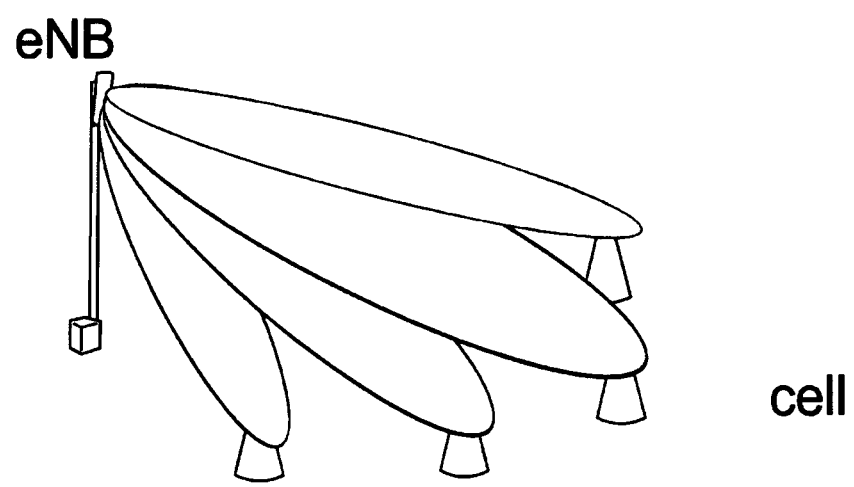
FIG. 1 recalls the topography of a cellular network comprising a transmitter (eNB) and different User Equipments (Cells).

Preliminary to the description of one particular practical embodiment of a regularized zero-forcing algorithm (II), some more theoretical considerations show to be appropriate for a full understanding of the principle of the invention (I).

I. Theoretical Considerations

1. Random Matrix Theory Tools

The proposed algorithm of the invention for the computation of the regularization parameter α is based on the following theoretical background knowledge:

Since the pioneering work of Wigner [1] on the asymptotic eigenvalue distribution of random Hermitian matrices, random matrix theory has grown into a new field of research in theoretical physics and applied probability. The main application to the telecommunication realm lies in the derivation of asymptotic results for large matrices. Specifically, the eigenvalue distribution of large Hermitian matrices converges, in many practical cases, to a definite probability distribution, called the empirical distribution of the random matrix. In several occasions in this work, we need to compute the trace of the resolvent $(X-zI)^{-1}$ of random Hermitian matrices $X$, which is given by the Stieltjes transform $S_x$, $$S_X(z) = \int_{-\infty}^{+\infty} \frac{1}{x-z}\mu_X(x)dx \quad (1)$$

where $\mu_x(x)$ is the empirical distribution of $X$.

Silverstein [2] derived a fixed-point expression of the Stieltjes transform for independent and identically distributed (i.i.d.) random matrices with left- and right-sided correlations in the following theorem:

Theorem 1 Let the entries of the N×K matrix $W$ be i.i.d. with zero mean and variance $1/K$. Let $X$ and $Q$ be N×N Hermitian deterministic matrices with empirical eigenvalue distribution functions converging weakly to $\mu_X$ and $\mu_Q$ almost surely. Let $Y$ be an N×N Hermitian matrix with the same eigenvectors as $X$ and let $f$ be some function mapping the eigenvalues of $X$ to those of $Y$. Then, as $K, N \to \infty$ with $N/K \to \alpha$ fixed, the Stieltjes transform $S_H(z)$ of $H=X^{1/2}WQW^HX^{1/2}+Y$ converges to $$S_H(z) = \int \left( f(x) + x\int \frac{q\cdot \mu_Q(q)dq}{1+\alpha q \mathcal{T}_H(z)} - z \right)^{-1} \mu_X(x)dx \quad (2)$$

Where $\mathcal{T}_H$ is the unique solution of the fixed-point equation $$\mathcal{T}_H(z) = \int x\left( f(x) + x\int \frac{q\cdot \mu_Q(q)dq}{1+\alpha q \mathcal{T}_H(z)} - z \right)^{-1} \mu_X(x)dx \quad (3)$$

Corollary 2 [2] Let the entries of the N×K matrix $W$ be i.i.d. with zero mean and variance $1/K$. Let $Y$ be an N×N Hermitian random matrix with an empirical eigenvalue distribution function converging weakly to $\mu_Y(x)$ almost surely. Moreover, let $Q$ be a K×K real diagonal random matrix with an empirical distribution function converging almost surely in distribution to a probability distribution function $\mu_Q(x)$ as $K \to \infty$. Then almost surely, the empirical eigenvalue distribution of the random matrix:

$$H=WQW^H+Y \quad (4)$$

Converges weakly, as $K, N \to \infty$ but $N/K \to \alpha$ fixed, to the unique distribution function whose Stieltjes transform satisfies:

$$S_H(z) = S_Y\left(z - \int \frac{q}{1+\alpha q S_H(z)}\mu_Q(q)dq\right) \quad (5)$$

2. System Model

Now lets consider the scenario where a base-station with M antennas communicates to K single-antenna terminals and in addition $M/K \geq 1$. The received signal vector $y \in \mathbb{C}^K$ of a narrow-band communication system reads $$y=Hx+n \quad (6)$$

with transmit vector $x \in \mathbb{C}^M$, channel matrix $H \in \mathbb{C}^{K \times M}$ and noise vector $n \in \mathbb{C}\mathcal{N}(0,\sigma^2 I_K)$.

Furthermore, the channel vector $h_k^H$ of user k is the kth row of H (K is a n index, addressing the users 1 to K).

The transmit signal vector x is obtained from the symbol vector $s \in \mathbb{C}^K$ by a linear precoding $G \in \mathbb{C}^{M \times K}=[g_1 \ldots g_k]$ and is $$x=Gs \quad (7)$$

where $E[ss^H]=I_K$ and G satisfies the total transmit power constraint $$E[x^Hx]=E[s^HG^HGs] \leq P \quad (8)$$

where P is the total available transmit power. The symbol received by user k is given by $$y_k = h_k^H g_k s_k + \sum_{i=1, i \neq k}^{K} h_k^H g_i s_i + n_k \quad (9)$$

We further assume that the channel H follows the widely used [3], [4] Kronecker model.

$$H=\Theta_R^{1/2} H_\omega \Theta_T^{1/2} \quad (10)$$

where $H_\omega \in \mathbb{C}^{K \times M}$ is a matrix with standard i.i.d. Gaussian (white) entries.

The correlation matrices $\Theta_T^{1/2} \in \mathbb{C}^{M \times M}$ and $\Theta_R^{1/2} \in \mathbb{C}^{K \times K}$ at the transmitter and receiver, respectively, are Hermitian positive-definite. In the MIMO broadcast channel the distance between the users is supposed to be sufficiently large compared to the signal wavelength, i.e. $\Theta_R^{1/2}=I_K$.

We also denote $$H' = \frac{1}{\sqrt{M}}H$$

and $$H'_w = \frac{1}{\sqrt{M}}H_w.$$

3. Regularized Zero Forcing Precoding

In the case of R-ZF precoding, for which the precoding matrix is given by $$G_{rzf} = H^H(HH^H + M\alpha I_K)^{-1} \quad (11)$$

$$\stackrel{(a)}{=} (H^HH + M\alpha I_M)^{-1}H^H \quad (12)$$

where $(\alpha)$ follows from the matrix inversion lemma (MIL) and we use a to satisfy the transmit power constraint in (8). The regularization term $M\alpha I_K$ contains the factor M to ensure that, as (K,M) grow large, both $tr(HH^H)$ and $tr(M\alpha I_K)$ grow with the same order of magnitude. For large (K,M), the constraint (8) determines $\alpha$ as follows:

$$1 = \frac{1}{M} tr[H'^H H'(H'^H H' + \alpha I_M)^{-2}] \quad (13)$$

$$\rightarrow \int \frac{v}{(v+\alpha)^2} \mu_{H'^H H'}(v) dv \quad (14)$$

$$= \int \left( \frac{1}{(v+\alpha)} - \frac{\alpha}{(v+\alpha)^2} \right) \mu_{H'^H H'}(v) dv \quad (15)$$

$$= S_{H'^H H'}(-\alpha) - \alpha \frac{d}{dx} S_{H'^H H'}(-\alpha) \quad (16)$$

with, from classical results on Stieltjes transforms [5], $$S_{H'^H H'}(z) = S_{\Theta_T^{1/2} H_w'^H H_w' \Theta_T^{1/2}}(z) \quad (17)$$

$$= \frac{1}{\beta} S_{H_w' \Theta_T H_w'^H}(z) - \frac{\beta-1}{\beta z} \quad (18)$$

Where $S_{H'_\omega \Theta_T H'_\omega{}^H}(z)$ satisfies the fixed-point equation (19)

$$S_{H_w' \Theta_T H_w'^H}(z) = \left( \int \frac{\lambda \mu_{\Theta_T}(\lambda) d\lambda}{1 + \frac{\lambda}{\beta} S_{H_w' \Theta_T H_w'^H}(z)} - z \right)^{-1} \quad (19)$$

and, from (19),:

$$\frac{d}{dx} S_{\Theta_T^{1/2} H_w'^H H_w' \Theta_T^{1/2}}(z) = \frac{1}{\beta} \frac{d}{dx} S_{H_w' \Theta_T H_w'^H}(z) + \frac{\beta-1}{\beta z^2} \quad (20)$$

where after differentiation of (19)

$$\frac{d}{dx} S_{H_w' \Theta_T H_w'^H}(z) = \frac{1 + \int \frac{\frac{\lambda^2}{\beta} \frac{d}{dx} S_{H_w' \Theta_T H_w'^H}(z)}{\left(1 + \frac{\lambda}{\beta} S_{H_w' \Theta_T H_w'^H}(z)\right)^2} \mu_{\Theta_T}(\lambda) d\lambda}{\left(S_{H_w' \Theta_T H_w'^H}(z)\right)^{-2}} \quad (21)$$

4. Cited References

[1] E. Wigner, "Random Matrices in Physics," SIAM Review, vol. 9, no. 1, January 1967

[2] J. W. Silverstein and Z. D Bai, "On the empirical distribution of eigenvalues of a class of large dimensional random matrices," Journal of Multivariate Analysis, vol. 54, issue 2, pp. 175 192, 1995

[3] A. M. Tulino, A. Lozano, and S. Verdu, "Impact of correlation on the capacity of multi-antenna channels," IEEE Trans. on Information Theory, vol. 51, no. 7, pp. 2491 2509, 2005

[4] C. Chuah, D. N. C. Tse, J. M. Kahn, R. A. V. Valenzuela, "Capacity Scaling in MIMO Wireless Systems Under Correlated Fading," IEEE Trans. On Information Theory, vol. 48, no. 3, pp. 637 650, 2002

[5] A. M. Tulino, S. Verdfi, "Random Matrix Theory and Wireless Communications," Now Publishers, vol. 1, issue 1, 2004"

II. Particular Embodiment of a Regularized Zero-Forcing Algorithm

It will now be described one practical embodiment of a MU-MIMO (Multi-User Multiple-Input and Multiple-Output) communication system comprising a transmitter and multiple user equipments.

In the particular embodiment being considered, the transmitter of a MU-MIMO system comprises M antennas which transmit data to K User Equipments (UEs). In FIG. 1, we can see an illustration of a M-antennas transmitter (eNB) transmits data to four (K=4) User Equipments (cells). As it can be seen in FIG. 1, interference occurs between the communications through the M×K different channels which might result in loss of data. In order to reduce the interference and compensate any loss, the embodiment which will be discussed below applies precoding process that is based on a Regularized Zero Forcing (R-ZF), involving the computation of regularization parameter $\alpha$ in according with the following formula:

$$G = H^H(HH^H + M\alpha I_K)^{-1}$$

$$= (H^H H + M\alpha I_M)^{-1} H^H$$

with H being a complex matrix that contains K×M channel estimates corresponding to the number M of antennas and the number K of UEs respectively. The channel coefficients in matrix H are correlated and the corresponding correlation coefficients are the entries of the correlation matrix $\Theta_T$ at the transmitter. In MU-MIMO communication systems, the UEs are not correlated thus the correlation matrix $\Theta_R$ at the receiver applied in equation (10) is equal to the identity matrix $I_K$. According to equation (10), the correlation matrix H for MU-MIMO will be:

$$H = H_w \Theta_T^{(1/2)}$$

As mentioned in Chapter 1 of the description, Hw is a matrix with standard independent and identically distributed Gaussian (white) entries.

Furthermore, $I_K$ and $I_M$ of the above Regularized Zero Forcing (R-ZF) linear precoding type represent the identity matrices of sizes K×K and M×M and $\alpha$ is the regularization parameter used for computing the precoding matrix G.

The inventors have designed a new process which allows a computation of $\alpha$ which does not depend on channel estimation. The regularization parameter $\alpha$ is computed by applying a process illustrated in FIG. 2 and including the following steps:

In a step 110 of the process, the transmitter computes the correlation matrix $\Theta_T$ by determining the eigenvectors $\Lambda$ and eigenvalues $\lambda$ of $\Theta_T$. This determination may be done by using a standard algorithm known to the skilled man.

Ref: Gene H. Golub and Charles F. Van Loan "Matrix Computations", Johns Hopkins University Press, 1996

In a step 120, the process initializes parameters $\alpha_{max}$ and $\alpha_{min}$ which respectively correspond to the maximum and the minimum limits used for computing the regularization parameter $\alpha$.

In a step 130, the process proceeds with computing $\alpha = \frac{1}{2}(\alpha_{max} + \alpha_{min})$.

In a further step 140, the process proceeds with determining, for $z = -\alpha$, a value of S which solves the following equation:

$$S(z) = \left( \int \frac{\lambda \mu_{\Theta_T}(\lambda) d\lambda}{1 + \frac{\lambda}{\beta} S(z)} - z \right)^{-1}$$

with $\lambda$ being the eigenvalues of the correlation matrix $\Theta_T$, $\mu$ being the empirical eigenvalue distribution functions of $\Theta_T$ and, finally, $\beta$ being M/K.

The reader's attention is drawn on the fact that such value S which is determined in step 140 corresponds to the value of $S_{H'_\omega \Theta_T H'^H_\omega}(z)$ of equation (19) in the Chapter I.

In a step 150, the process proceeds with determining, for $z=-\alpha$, a value of Sd that solves the following equation:

$$S_d(z) = \frac{1 + \int \frac{\frac{\lambda^2}{\beta} S_d(z)}{\left(1 + \frac{\lambda}{\beta} S(z)\right)^2} \mu_{\Theta_T}(\lambda) d\lambda}{(S(z))^{-2}}$$

The reader's attention is drawn on the fact that such value Sd which is determined in step 150 corresponds to the value of $$\frac{d}{dx} S_{H'_w \Theta_T H'^H_w}(z)$$

in equation (21).

In a step 160, the process proceeds with computing a variable F that represents the transmit power of the transmitter. F is computed by applying the following formula:

$$F = \frac{S}{\beta} + \frac{\beta - 1}{\beta \alpha} - \alpha \left( \frac{S_d}{\beta} + \frac{\beta - 1}{\beta \alpha^2} \right)$$

Finally, steps 170, 180 and 190 are three steps which are used for adapting the interval $[\alpha_{min}, \alpha_{max}]$ before proceeding further to a new iteration.

Indeed, step 170, corresponds to a test for comparing the transmit power F with the total available transmit power P.

Specifically, if F−P<0 in step 170 then, in a step 180, the process proceeds with computing $\alpha_{max} = \alpha$.

Otherwise if F−P>0, the process proceeds with a step 190 and computes $\alpha_{min} = \alpha$.

Figure 2:
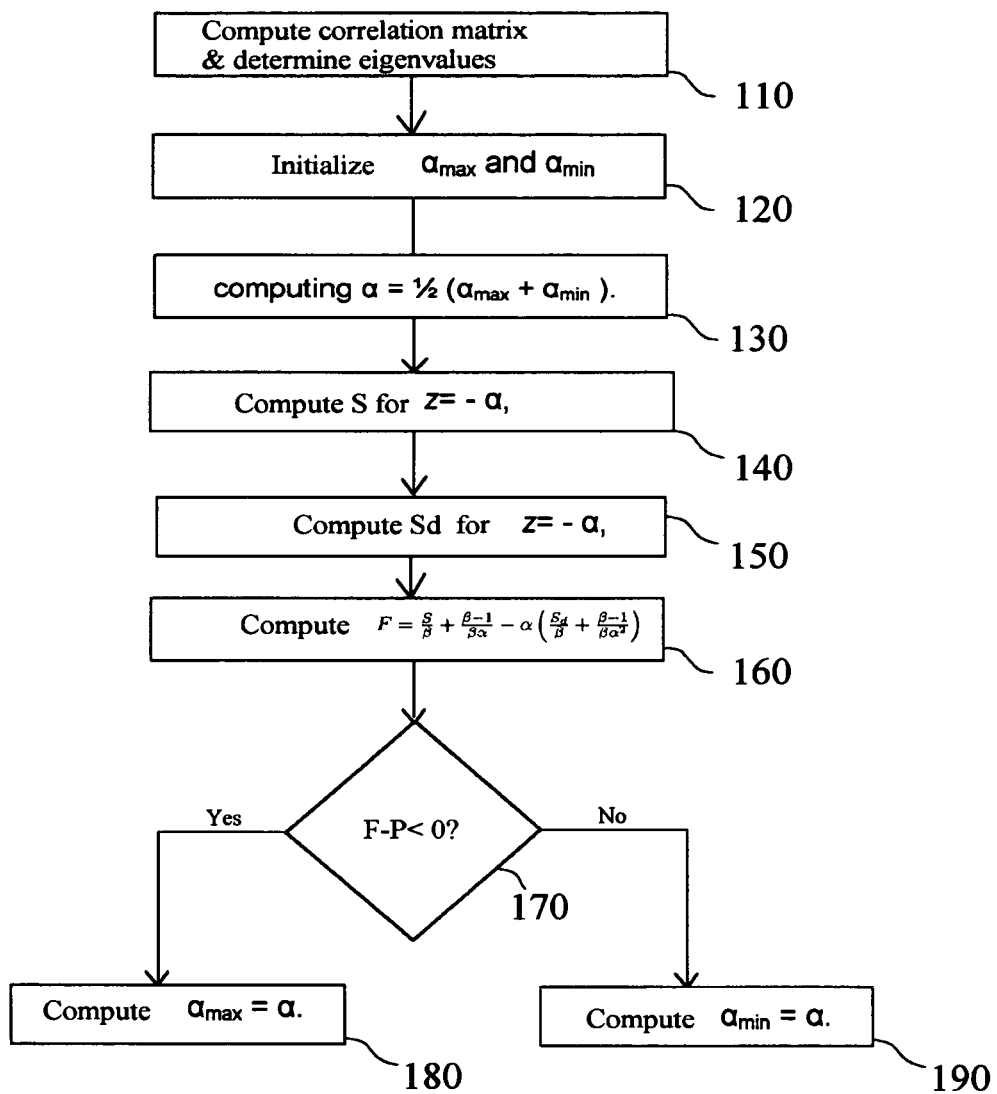
FIG. 2 illustrates a first embodiment of a process for computing the regularization parameter α

The process which was described in reference to FIG. 2 can be subject of a wide number of different implementation by a skilled man.

FIG. 3 shows an alternative embodiment, based on the use of a WHILE loop and two FOR loops.

Indeed, a WHILE loop is used for computing the regularization parameter $\alpha$ of the precoding process, which is executed as long as the absolute value of F−P (ABS(F−P)) is superior to a maximum transmit power constraint $\epsilon$. In a particular embodiment of the invention $\epsilon$ is set to be equal to $10^{-3}$.

The embodiment of FIG. 3 shows that a first FOR loop is used in step 140 of the precoding process in order to solve the fixed-point equation (19), which first FOR loop is executed for a number of N occurrences (n=1 to N).

The first FOR loop involves an initialization of S to a predetermined value which can be set to 0 in one particular embodiment.

The first FOR loop then involves a second step of computing S for n=1 to N by using the following type:

$$S = \left( \alpha + \frac{1}{M} \sum_{i=1}^{M} \frac{\lambda_i}{1 + \frac{\lambda_i}{\beta} S} \right)^{-1}$$

Indeed the number of eigenvalues L of the transmit correlation matrix corresponds to the number of transmit antennas M With $\lambda_i$ being the eigenvalues of the correlation matrix $\Theta_T$ and $\beta$ being equal to M/K. The above type corresponds to equation (19) of Chapter I.

With respect to FIG. 3 again, there is shown a second FOR loop is used in step 150 of the precoding process in order to solve the fixed-point equation (21). The second FOR loop is again executed for a number of N occurrences (n=1 to N).

Said second FOR loop comprises a first step of initialization of $S_d$ to a predetermined value which in a particular embodiment of the invention can be 0 ($S_d$=0).

Furthermore, the second FOR loop proceeds to a second step of computing $S_d$ for n=1 to N by using the following type:

$$S_d = \left( 1 + \frac{1}{M} \sum_{i=1}^{M} \frac{\frac{\lambda_i^2}{\beta} S_d}{\left(1 + \frac{\lambda_i}{\beta} S\right)^2} \right) \cdot S^2$$

With $\lambda_i$ being the eigenvalues of the correlation matrix $\Theta_T$ and $\beta$ being M/K. The above type corresponds to equation (21) of Chapter I.

In a preferred embodiment of the invention, the number K of the UEs and the number M of the antennas in the transmitter of a MU-MIMO system can be equal (K=M).

Figure 4:
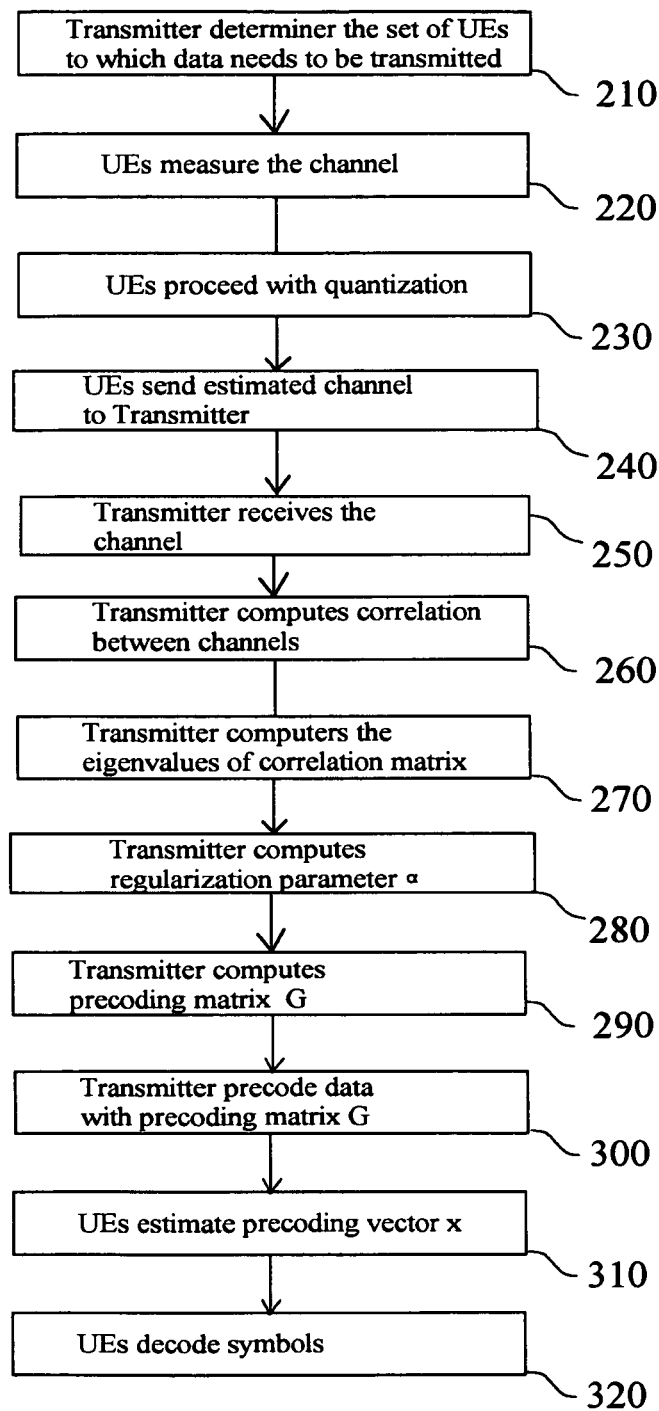
FIG. 4 illustrates a general transmission process based on a Regularized Zero Forcing in accordance with the present invention.

FIG. 4 illustrates the application of the invention in a more comprehensive process executed in the transmitter and which is based on the Regularized Zero Forcing (R-ZF) precoding described above.

The complete process comprises the following steps:

In a step 210 of the process the transmitter determines the set of UEs to which data needs to be transmitted. Both the transmitter and the UEs are synchronized and configured in MU-MIMO mode.

In a step 220 of the process, the UEs measure the channel, for example via known conventional reference symbols (not precoded) transmitted by the transmitter.

In a step 230, the UEs proceed with quantizing the estimated channel.

In a step 240, the UEs proceed with sending the estimated channel to the transmitter.

In a step 250 of the process, the transmitter receives the channels from the selected UEs.

In a step 260 of the process, the transmitter computes the correlation between the channels of the UEs using all available channels of the selected UEs (also past channels can be used). This can be done for example by computing the cross-correlation between the channels of the UEs.

In a step 270 of the process, the transmitter computes the eigenvalues $\Lambda$ of the correlation matrix $\Theta_T$ using the correlation coefficients computed in the previous step. The eigenvalues can be calculated by a standard algorithm.

In a step 280 of the process, the transmitter computes the regularization parameter $\alpha$ using the process depicted in FIG. 2.

In a further step 290, the transmitter uses the regularization parameter $\alpha$ together with the channel matrix H in order to compute the precoding matrix G according to equation (11).

In a step 300 of the process, the transmitter precodes the data and particularly the data symbols. The process uses the precoding matrix G and applies the equation x=Gs (7). In equation (7), x is the transmit signal vector while s is the symbol vector of the transmitted data.

In a step 310 of the process, the UEs estimate their precoding vector x, for example via dedicated pilots (i.e. known reference symbols that are precoded with the beamforming vector of a specific UE) send by the eNodeB or by explicit feedback of the quantized beamforming vector.

In a final step 320, the UEs decode their data, which are represented by symbols.

Figure 5:
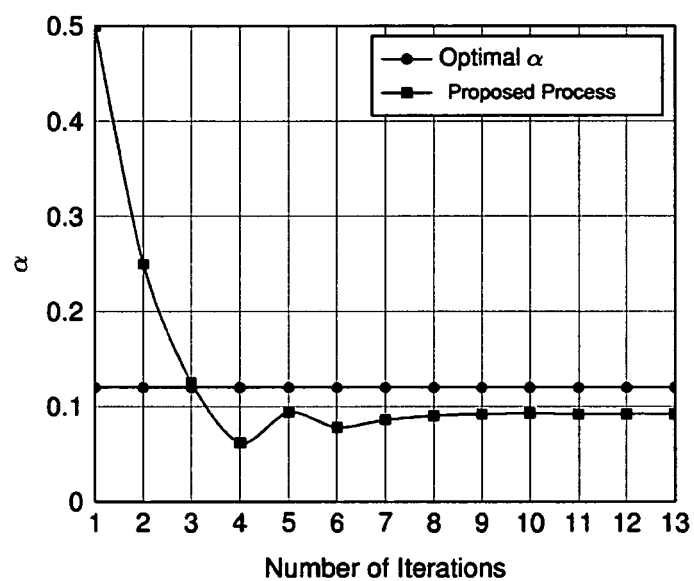
FIG. 5 illustrates the convergence behaviour of the proposed algorithm for computing a in 4×4 MIMO
Figure 6:
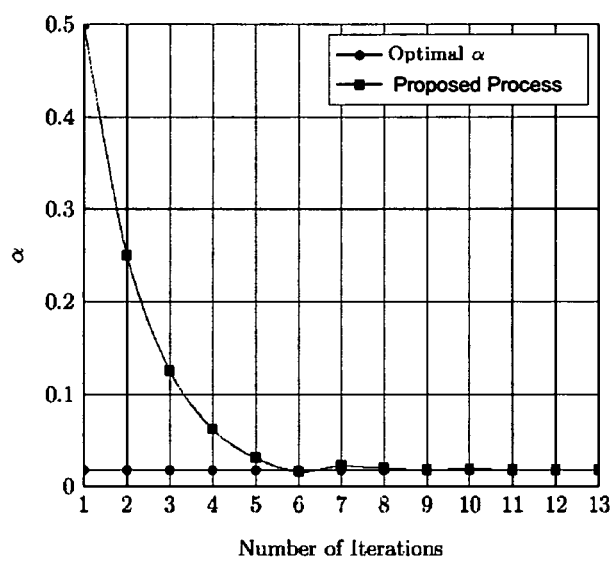
FIG. 6 illustrates the convergence behavior of the proposed algorithm for computing a in 32×32 MIMO

FIGS. 5 and 6, show the convergence behavior of the regularization parameter $\alpha$ computed by the proposed process which was described above, and the optimal regularization parameter $\alpha$.

Specifically, FIG. 5 depicts the convergence existing in a 4×4 MIMO communication system that has a small number of antennas and UEs (M=K=4). In that case, a small residual error is observed in the convergence.

The optimal alpha is the regularization parameter that is computing with full channel knowledge at the transmitter with an exhaustive search algorithm. The number of iteration corresponds to the number of times the WHILE loop is executed. Medium correlation corresponds to a predefined correlation matrix in in the 3GPP UMTS rel8 standard. Finally the SNR is the signal-to-noise ratio which is in this case set to 10 dB.

On the other hand, FIG. 6 depicts the convergence existing in a 32×32 MIMO system with a large number of antennas and UEs (M=K=32). In that case the residual error of the convergence is minimized. The reason for this minimization is that the process is based on asymptotic results when the number of antennas grows large. Furthermore it can be seen that, according to FIGS. 5 and 6, the process converges about 8-10 iterations.

In this example we used a correlation matrix (at transmitter) arising when the transmitter is employing a Uniform Circular Array of radius r. The antennas are uniformly spaced on this circular array and correlation arising due to there close spacing.

The invention claimed is:

1. Precoding process for a transmitter of a MU-MIMO communication system comprising:

M antennas in the transmitter and K User Equipments (UE), said precoding being based on a Regularized Zero Forcing (R-ZF) linear precoding of the type:

$$G = H^H(HH^H + M\alpha I_K)^{-1}$$
$$= (H^H H + M\alpha I_M)^{-1} H^H$$

With:
H being a complex matrix representative of the K×M channel estimates, said H matrix comprising channel coefficients which are correlated with corresponding correlation coefficients being the entries of a correlation matrix $\Theta_T$,
$I_K$ and $I_M$ being the identity matrix, respectively of size K×K and M×M;
And $\alpha$ being the regularization parameter,
wherein $\alpha$ is computed as follows:
a) computing the correlation matrix $\Theta_T$;
b) initializing two parameters $\alpha_{max}$ and $\alpha_{min}$;
c) computing $\alpha=\frac{1}{2}(\alpha_{max}+\alpha_{min})$;
d) determining (140) for z=−$\alpha$ the value of S ($S_{H'_\omega \Theta_T H'^H_\omega}(z)$) solving the fixed-point equation:

$$S(z) = \left(\int \frac{\lambda \mu_{\Theta_T}(\lambda) d\lambda}{1 + \frac{\lambda}{\beta} S(z)} - z\right)^{-1}$$

With $\lambda$ being the eigenvalues of the correlation matrix $\Theta_T$, $\mu$ being the empirical eigenvalue distribution functions of $\Theta_T$ and $\beta$ being M/K;
e) determining for z=−$\alpha$ the value of $S_d$ $$\left(\frac{d}{dx} S_{H'_\omega \Theta_T H'^H_\omega}(z)\right)$$

solving the fixed-point equation:

$$S_d(z) = \frac{1 + \int \frac{\frac{\lambda^2}{\beta} S_d(z)}{\left(1 + \frac{\lambda}{\beta} S(z)\right)^2} \mu_{\Theta_T}(\lambda) d\lambda}{(S(z))^{-2}}$$

f) computing the equation $$F = \frac{S}{\beta} + \frac{\beta-1}{\beta\alpha} - \alpha\left(\frac{S_d}{\beta} + \frac{\beta-1}{\beta\alpha^2}\right)$$

g) adapting the interval [$\alpha_{min}$, $\alpha_{max}$] as follows:
if F−P<0, with P being the total available transmit power, then computing (180) $\alpha_{max}=\alpha$, otherwise computing $\alpha_{min}=\alpha$.

2. Precoding process according to claim 1 wherein step a is computed by a WHILE loop used for computing the regularization parameter $\alpha$ of the precoding process, said WHILE loop being executed as long as the absolute value of F−P (ABS(F−P)) is superior to a predetermined value $\epsilon$.

3. Precoding process according to claim 2, wherein step d is performed by a first FOR loop executed for a number of N occurrences, said first FOR loop comprising the steps of:
initializing S to a predetermined value;
performing, for n=1 to N, the following computation:

$$S = \left(\alpha + \frac{1}{M} \sum_{i=1}^{M} \frac{\lambda_i}{1 + \frac{\lambda_i}{\beta} S}\right)^{-1}.$$

4. Precoding process according to claim 3, wherein step e is performed by a second FOR loop which is executed for a number of N occurrences, said second FOR loop comprising the steps of:
initializing $S_d$ to a predetermined value;
performing, for n=1 to N, the following computation:

$$S_d = \left(1 + \frac{1}{M} \sum_{i=1}^{M} \frac{\frac{\lambda_i^2}{\beta} S_d}{\left(1 + \frac{\lambda_i}{\beta} S\right)^2}\right) \cdot S^2.$$

5. Precoding process in accordance to claim 1 wherein K=M.

6. Transmitter for a MU-MIMO communication system comprising M antennas in the transmitter and K User Equipments (UE), said precoding being based on a Regularized Zero Forcing (R-ZF) linear precoding of the type:

$$G = H^H(HH^H + M\alpha I_K)^{-1}$$
$$= (H^H H + M\alpha I_M)^{-1} H^H$$

With:
H being a complex matrix representative of the K×M channel estimates, said H matrix comprising channel coefficients which are correlated with corresponding correlation coefficients being the entries of a correlation matrix $\Theta_T$;
$I_K$ and $I_M$ being the identity matrix, respectively of size K×K and M×M;
And $\alpha$ being the regularization parameter,
said transmitter being characterized in that it comprises:
means for computing the correlation matrix $\Theta_T$;
means for initializing the two parameters $\alpha_{max}$ and $\alpha_{min}$
means for computing $\alpha = \frac{1}{2}(\alpha_{max} + \alpha_{min})$;
means for determining for $z = -\alpha$ the value of S solving the fixed-point equation:

$$S(z) = \left( \int \frac{\lambda \mu_{\Theta_T}(\lambda) d\lambda}{1 + \frac{\lambda}{\beta} S(z)} - z \right)^{-1}$$

means for determining for $z=-\alpha$ the value of $S_d$ $$\left( \frac{d}{dx} S_{H'_w \Theta_T H'^H_w}(z) \right)$$

solving the fixed-point equation:

$$S_d(z) = \frac{1 + \int \frac{\frac{\lambda^2}{\beta} S_d(z)}{\left(1 + \frac{\lambda}{\beta} S(z)\right)^2} \mu_{\Theta_T}(\lambda) d\lambda}{(S(z))^{-2}}$$

means for computing the equation $$F = \frac{S}{\beta} + \frac{\beta-1}{\beta\alpha} - \alpha\left( \frac{S_d}{\beta} + \frac{\beta-1}{\beta\alpha^2} \right)$$

means for adapting the interval $[\alpha_{min}, \alpha_{max}]$ by using the following process:
if F−P<0, with P being the total available transmit power, then compute $\alpha_{max} = \alpha$, otherwise compute $\alpha_{min} = \alpha$.

7. Transmitter according to claim 6 wherein it includes means for performing a WHILE loop used for computing the regularization parameter $\alpha$ of the precoding process, said WHILE loop being executed as long as the absolute value of F−P (ABS(F−P)) is superior to a predetermined value $\epsilon$.

8. Transmitter according to claim 7 wherein it further includes means for performing by a first FOR loop executed for a number of N occurrences, further comprising:
means for initializing S to a predetermined value;
means for performing, for n=1 to N, the following computation:

$$S = \left( \alpha + \frac{1}{M} \sum_{i=1}^{M} \frac{\lambda_i}{1 + \frac{\lambda_i}{\beta} S} \right)^{-1}.$$

9. Transmitter according to claim 8 further comprising means for executing a second FOR loop for a number of N occurrences which includes:
means for initializing $S_d$ to a predetermined value;
means for performing, for n=1 to N, the following computation:

$$S_d = \left( 1 + \frac{1}{M} \sum_{i=1}^{M} \frac{\frac{\lambda_i^2}{\beta} S_d}{\left(1 + \frac{\lambda_i}{\beta} S\right)^2} \right) \cdot S^2.$$

10. Transmitter according to claim 6 wherein K=M.

* * * * *